Figure 1:
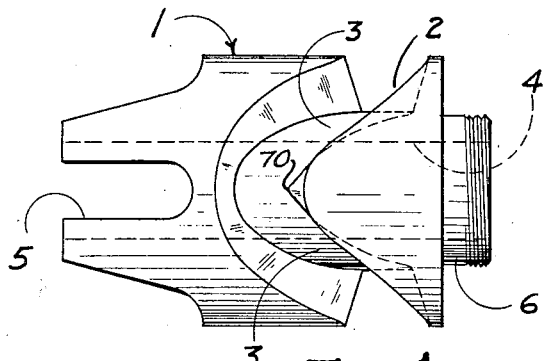

April 25, 1944.  V. PALUMBO  2,347,364
CAM MEMBER FOR ENGINES OR THE LIKE
Filed Feb. 16, 1942  2 Sheets-Sheet 1

INVENTOR.
VINCENT PALUMBO
BY Hull & West
ATTORNEYS.

April 25, 1944. V. PALUMBO 2,347,364
CAM MEMBER FOR ENGINES OR THE LIKE
Filed Feb. 16, 1942 2 Sheets-Sheet 2

INVENTOR.
VINCENT PALUMBO
BY Hull West
ATTORNEYS.

Patented Apr. 25, 1944

2,347,364

UNITED STATES PATENT OFFICE 2,347,364

CAM MEMBER FOR ENGINES OR THE LIKE

Vincent Palumbo, Cleveland, Ohio

Application February 16, 1942, Serial No. 431,086

6 Claims. (Cl. 74—57)

The present invention had its conception in the development and production of the cam member incorporated in the internal combustion engine disclosed in my copending application No. 360,967, filed October 12, 1940, whereon Patent No. 2,288,480 was granted June 30, 1942.

Briefly, the engine to which reference is made is of the type wherein the engine shaft is disposed axially of the cylinders, and pistons are reciprocable in the cylinders in opposed relation to each other and surround the shaft. A cam member is associated with, and is suitably connected, as by a swivel joint, to each piston. Each cam member is splined to the shaft and has an endless, peripheral, helical groove characterized by reversely inclined reaches. Thrust elements are carried by the engines housing and project into the groove for effecting rotary motion of the member as it reciprocates with the piston, thereby to impart rotary motion to the engine shaft.

The primary purpose of this invention is the production of a cam member for engines or the like of the type above described, wherein the cam groove is of such nature that the piston has a true harmonic motion while the shaft has a uniform rotary motion.

To bring about this result, I duplicate, in the generation of the cam groove, or in the production of the cam member, so to speak, the same relative movements between a cylindrical drum and blank and a suitable implement—for example, an end mill or other appropriate tool—that are desired under actual working conditions between the cam member and the thrust element that cooperates with its cam groove.

It is evident, therefore, that the cam member is bound to perform in the manner desired, inasmuch as its groove is generated or produced under conditions approximating those encountered in operation.

Another important consideration in engines or the like of the sort described is a proper balance between the reacting forces responsible for converting the axial movement of the piston into rotary movement of the shaft during the power stroke, for example, and those which effect conversion of the rotary motion of the shaft (caused by the inertia of the flywheel) into the axial movement of the piston during, for instance, the compression stroke. This balance is brought about by disposing the adjacent inclined reaches of the peripheral helical groove, where it cuts the cylindrical surface of the cam member, at an angle of approximately 90° to each other, or each approximately 45° to the longitudinal axis of the cam member, this obviously resulting from a given ratio between the reciprocatory movements of the implement or tool and the rotary movements of the member during production thereof by the method above set forth. Also, this relationship of adjacent reaches may be said to result from the fact that the length of the stroke bears a certain relation to the radius of the cam body, as will hereinafter more fully appear. By such an arrangement of said reaches, the maximum mean efficiency of the power transmitting cam member is realized, and any deviation from the described arrangement in favor of either function results in a corresponding sacrifice with respect to the other.

In the preferred embodiment of the invention, the cam groove has four inclined reaches in the circumference of the member and, as above stated, these reaches are disposed at about 45° to the axis of the member, or, in other words, adjacent reaches are at an angle of about 90° to each other. Therefore, in an engine or the like incorporating the member, there would be four strokes of the piston—or two complete reciprocations thereof—for each rotation of the shaft. It happens, in such a proportioned member, that the distance between planes normal to the axis of the member and coinciding with the center of the groove at the extremes of the inclined reaches thereof approximates the radius of the member. In the apparatus by which the groove, in such a proportioned member, is cut, mechanism rotates a cylindrical blank that ultimately constitutes said member in operative relation to an end mill or other appropriate cutting tool and, through transmission means effecting a two-to-one reduction, drives a crank by which, through the intervention of a so-called Scotch yoke, the tool is reciprocated longitudinally of the blank. Under the circumstances mentioned, the throw of the crank corresponds approximately to the radius of the blank.

Figure 2:
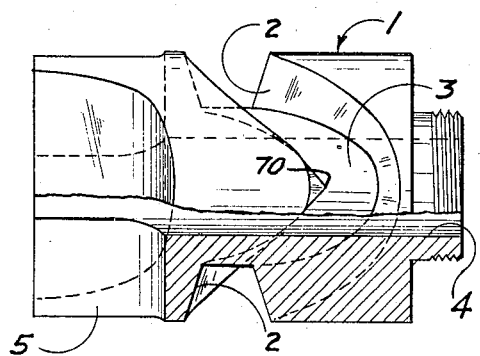
Figure 3:
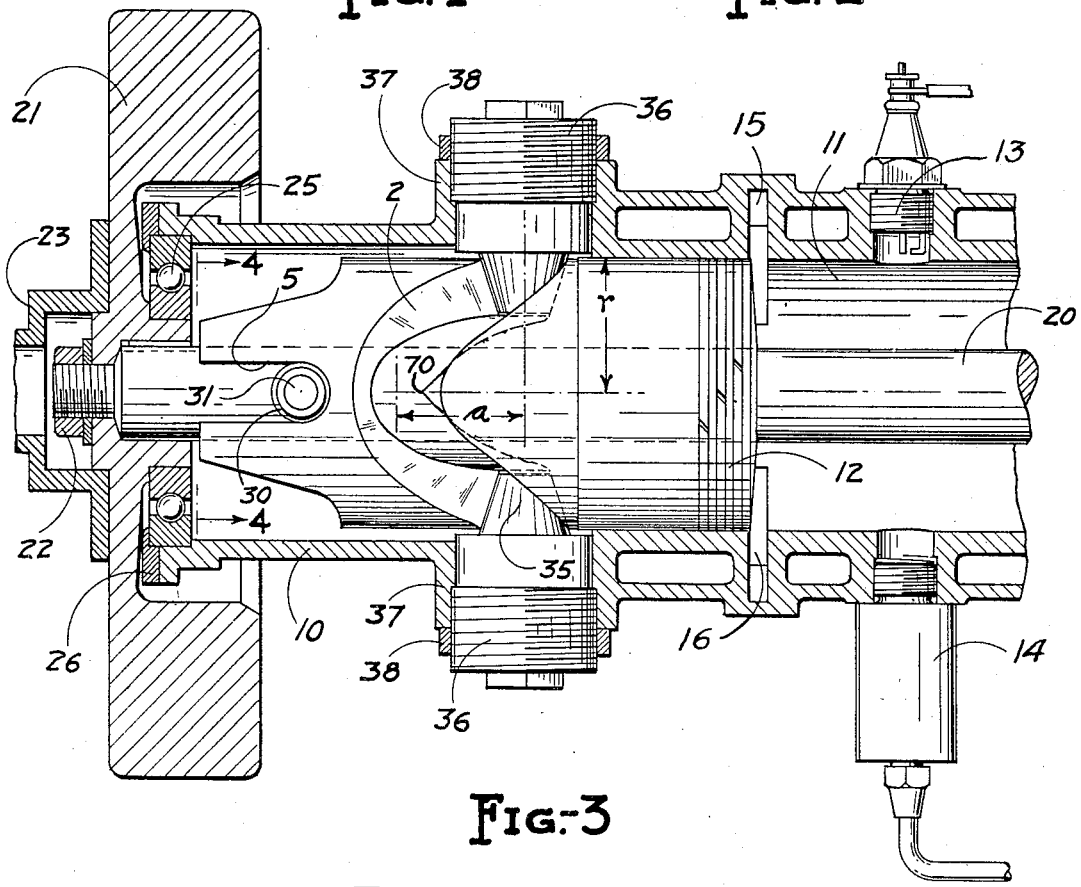
Figure 4:
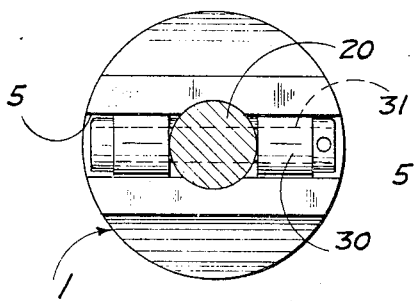
Figure 5:
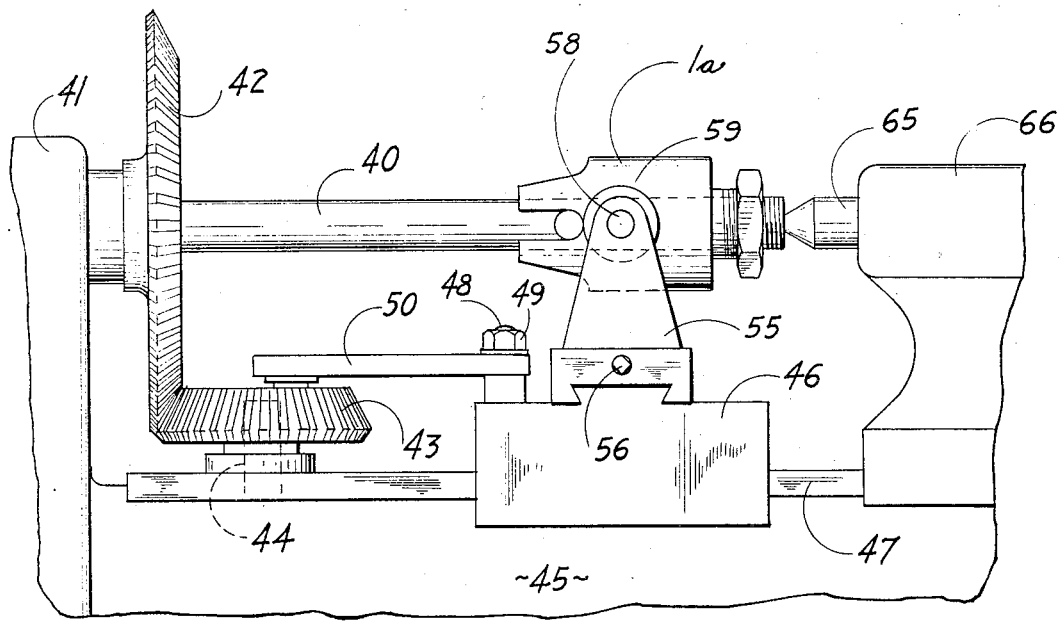
Figure 6:
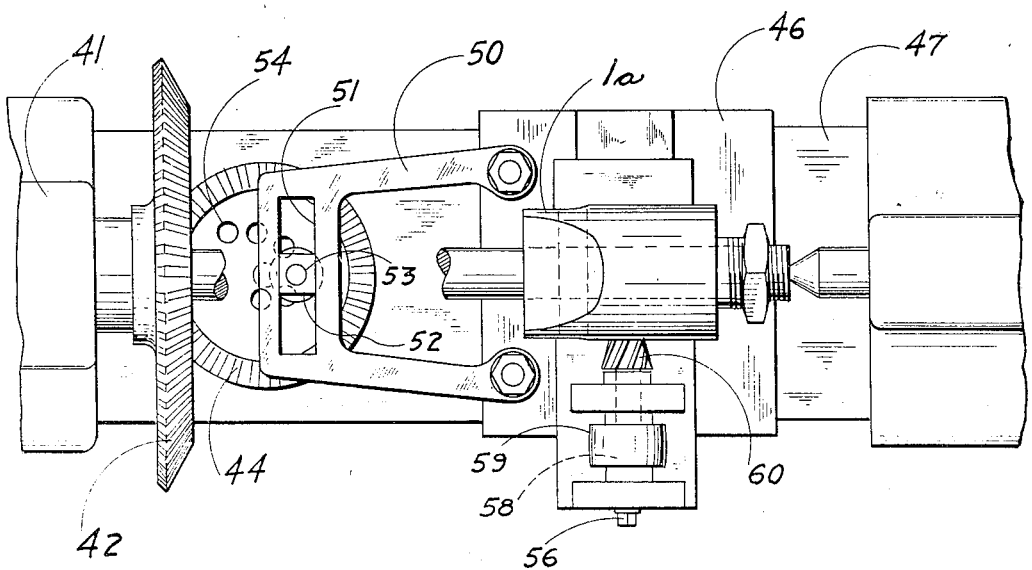

In the accompanying drawings, Fig. 1 is a side elevational view of a cam member embodying the invention; Fig. 2 is a somewhat similar view of the member showing it turned on its axis through 90° from the position it occupies in Fig. 1 and as being, throughout its lower half, in central longitudinal section; Fig. 3 is a fragmentary central longitudinal section through an engine incorporating the cam member of my invention; Fig. 4 is a sectional detail on the line 4—4 of Fig. 3, and Figs 5 and 6 are, respectively, a fragmentary side elevation, and a similar plan view, of an apparatus or machine by which the peripheral helical groove of the cam member is developed or produced.

The cam member, designated generally by the reference numeral 1, is shown as a cylindrical body surrounded by a helical groove 2 made up in most part of reversely inclined reaches 3. The opposed walls of the groove converge inwardly along lines defining an angle whose vertex is coincident with the axis of the body, and adjacent the cylindrical surface of the body, the distance (indicated $a$ in Fig. 3) between planes normal to the axis of the body and coincident with the center of the groove at the extremes of the inclined reaches thereof is substantially equal to the radius ($r$) of the body.

While I have shown the body of the cam member as having a continuous cylindrical surface, excepting where it is interrupted by the groove, obviously it could be cut away on opposite sides of the groove, as shown in the above mentioned patent, for the sake of lightness. The body has a longitudinal bore 4, and at one end is formed with a bifurcated extension that provides diametrically opposed open ended slots 5. A cylindrical boss 6 is shown as extending axially from the opposite end of the body and is threaded adjacent its extremity, this being the part to which a piston is adapted to be connected, desirably by a swivel joint, as disclosed in the patent aforesaid.

The cam member is shown in Fig. 3 as incorporated in an internal combustion engine, similar to that illustrated in my former application that matured into the above identified patent. Only so much of the engine is included in said view, however, as will serve the present needs. The engine housing 10 is generally cylindrical, and operating in a working chamber 11 thereof is a piston 12.

The piston 12 is one of a pair that are arranged in opposed relation to each other, as above explained, and as fully disclosed in the patent above referred to. The working chamber 11, therefore, constitutes a cylinder that is common to the two pistons, and opening into the working chamber at its longitudinal center are diametrically opposed openings within one of which is located a spark plug 13, and in the other, a fuel injector 14. When the pistons are furthest from each other, they uncover inlet ports at one end of the working chamber, and exhaust ports at the other; and the ports of one such pair (the exhaust ports, for example) are shown at 15 and 16 in Fig. 3.

For the present purpose it may be explained, briefly, that when the ports are uncovered, a charge of fresh air is injected by suitable means (not shown) through the inlet ports in sufficient amount to thoroughly scavenge the working chamber of the burnt gases of the previous explosion or working stroke (such gases escaping through the exhaust ports). As the pistons next approach each other they compress the volume of air between them, and preferably near the conclusion of the compression stroke, a charge of fuel is shot into the working chamber by the injector 14. At the proper moment, according to the action of the timing mechanism of the ignition system, the spark plug is energized to ignite the compressed mixture and effect the next explosion stroke. It will be seen, therefore, that with the present design of cam member, there will be two explosion or power strokes and likewise a similar number of compression strokes during each rotation of the engine shaft.

The engine shaft 20 is disposed axially of the cylindrical housing 10 and likewise of the working chamber 11 and at one end has keyed to it a flywheel 21, shown as held to the shaft by a nut 22 that is applied to the reduced threaded end of the shaft where it extends beyond the hub of the flywheel. The flanged end of a hollow drive shaft 23 is suitably secured to the flywheel, and the flywheel is supported for rotation, through an anti-friction bearing 25, within the end of the engine housing 10, the outer race of the bearing being held inwardly against a shoulder of the housing by a clamping ring 26.

The piston 12 is suitably connected to the cam member for reciprocation therewith, preferably by a swivel joint, as shown in my aforesaid patent, and occupying the diametrically opposed slots 5 of the cam member are rollers 30, shown as mounted on a cross pin 31 that extends through the shaft 20 (Fig. 4). By this arrangement a simple, strong and efficient driving connection is effected between the shaft and cam member which permits the cam member to reciprocate freely along the shaft 20, the bore 4 of the member being of such diameter as to afford a sliding fit of the member on the shaft. Obviously, for an intermediate part of its length, the bore 4 may be enlarged to provide clearance and thus reduce the friction. In lieu of that just described, any other suitable driving connection between the cam member and shaft may be employed as, for example, that disclosed and claimed in the above mentioned patent.

Diametrically opposed conical thrust elements 35 are carried by the engine housing and project into the groove 2 of the cam member thereby causing the cam member to rotate as it reciprocates, such movement of the member being transmitted to the shaft through the rollers 30 and pin 31. The thrust elements 35 are in the nature of rollers having extensions that are journaled in caps 36, threaded within bosses 37 of the engine housing and secured in properly adjusted position by lock nuts 38, all of which is in accordance with the disclosure of my previously mentioned patent where the parts are shown and described in detail. The thrust elements 35 are frustums of cones which, if extended, would have their apexes coincident with the axis of the shaft 20.

So that the exact nature of the groove may be better understood I have illustrated in Figs. 5 and 6 the machine or apparatus by which the cam groove 2 is cut in the cylindrical body of the member 1. The blank that will, then grooved, constitute the cam member, is designated 1$^a$ in the aforesaid views and it is removably supported upon a spindle 40. The apparatus may be in the nature of a lathe, and as such it is shown fragmentarily in the drawings. The spindle 40 is rotatably supported and driven in the manner customary in laths, and one of the bearings in which the spindle is journaled is designated 41. Adjacent said bearing the spindle has secured to it a bevel gear 42 that meshes with a similar but smaller gear 43 that is sustained for rotation on a vertical axis by a stub shaft 44, suitably supported from the bed 45. The ratio of the gears 42 and 43 is approximately two-to-one. This ratio may be changed according to the results desired.

A saddle 46 is mounted upon ways 47 of the bed 45 for reciprocation therealong; and fastened to it, by studs 48 and nuts 49, are the branches of a yoke 50 that constitutes an extension of the saddle and overlies the gear 43 where it is provided with a transverse guideway 51, the element 50, in its present form, being a modification of the so-called Scotch yoke. Slidable within the guideway 51 is a block 52 that is mounted on a crank pin 53, carried by the gear 43. The crank pin may be rendered adjustable toward and from the center of the gear by providing a series of holes 54 that are spaced at different distances from the center of rotation of the gear and in any selected one of which the pin may be inserted.

Mounted upon the saddle 46 in the usual way for sliding movement transversely thereof is a tool support 55. 56 designates the screw, that may be rotated at will in any convenient manner, for feeding the tool support laterally of the saddle. Journaled in the tool support is a spindle 58 that carries a driving element 59, such as a pulley, by means of which the spindle may be rotated by appropriate power mechanism (not shown). Suitably connected to the inner end of the spindle is a cutting tool 60 that may consist, for example, of an end mill. The tool is located in the horizontal plane of the axis of the blank 1ª, and preferably has the shape of one of the thrust elements 35.

The free end of the spindle 40 is sustained in accurate position by a dead center 65 that is mounted in the tail stock 66 which, in turn, is supported on the ways 47 for adjustment therealong.

When the machine is operating, the spindle 40 rotates slowly. At an increased speed relative thereto, the gear 43 is driven by the gear 42 so as to reciprocate the saddle through the connections above described. After each rotation of the blank 1ª, the tool 60 may be fed inwardly a suitable distance to effect another cut by turning the screw 56. The foregoing operations continue until the groove is cut to the proper depth.

I am aware that many unsuccessful attempts have been made in the past to produce a practical and satisfactory engine of the type herein referred to, and it is my opinion that failure has resulted principally from an improper shape of the groove of the cam members. Experiments have convinced me that the cam groove of the instant invention will overcome the main difficulty heretofore experienced and render an engine incorporating the same well balanced and smooth in performance and practically free from vibration and very efficient in operation.

As will be observed from Figs. 1, 2 and 3, the inner sides of contiguous reaches of the cam groove at each turn thereof join each other in such manner as to define a relatively sharp point 70 adjacent the bottom of the groove. This feature insures against a "dead point" at the turn of the groove and permits immediate reversal of the cam member without the slightest obstruction to such action.

Having thus described my invention, what I claim is:

1. In crankless mechanism for converting reciprocating motion into rotary motion and vice versa with an effect simulating that of a crank transmission, two relatively movable instrumentalities, the first consisting of a rotatably supported drum cam having an endless helical peripheral groove charactertized by reversely inclined reaches and of such shape that a point traversing the center line of the groove and progressing with uniform motion circumferentially of the cam will vibrate axially thereof with true harmonic motion, the second instrumentality consisting of a thrust element engaged within said groove, means restricting movement of the second instrumentality relative to the first to a direction axially of the latter, and means for delivering motive power to one of said instrumentalities.

2. In crankless mechanism for converting reciprocating motion into rotary motion and vice versa with an effect simulating that of a crank transmission, two relatively movable instrumentalities, one consisting of a rotatably supported drum cam having an endless helical peripheral groove characterized by reversely inclined reaches and of such shape that a point traversing the center line of the groove and progressing with uniform motion circumferentially of the cam will vibrate axially thereof with true harmonic motion, the distance, at the cylindrical surface of the cam, between planes normal to the axis of the cam and coinciding with the center of the groove at the extremes of said reaches, approximating the radius of the cam, the second instrumentality consisting of a thrust element engaged within said groove and restricted in its movement relative to the first instrumentality to a direction axially of the latter, and means for delivering motive power to one of said instrumentalities.

3. Crankless mechanism according to claim 2, wherein said groove is composed of four equal, reversely inclined reaches.

4. In crankless mechanism for converting reciprocating motion into rotary motion and vice versa with an effect simulating that of a crank transmission, two relatively movable instrumentalities, one consisting of a rotatably supported drum cam having an endless helical peripheral groove characterized by reversely inclined reaches and of such shape that a point traversing the center line of the groove and progressing with uniform motion circumferentially of the cam will vibrate axially thereof with true harmonic motion, the angle between adjacent reaches being approximately 90°, and the sides of diametrically opposite portions of the groove in any transverse plane of the groove converging along straight lines that intersect at the axis of the cam, the second instrumentality consisting of a thrust element engaged within said groove and restricted in its movement relative to the first instrumentality to a direction axially of the latter, and means for delivering motive power to one of said instrumentalities.

5. Crankless mechanism according to claim 4, wherein the inner sides of contiguous reaches at each turn of the groove join in such manner as to define a sharp point adjacent the bottom of the groove.

6. In crankless mechanism, a shaft, a drum cam on the shaft rotatable therewith and having an endless helical peripheral groove of the shape of a true harmonic curve, and a thrust element engaged within said groove and confined in its movement relative to the cam to a direction axially of the latter.

VINCENT PALUMBO.